United States Patent
Ukawa

(10) Patent No.: US 7,283,438 B2
(45) Date of Patent: Oct. 16, 2007

(54) OPTICAL DISC PLAYBACK APPARATUS PERFORMING DEFOCUS ADJUSTMENT OF OBJECTIVE LENS

(75) Inventor: Yoshiaki Ukawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 587 days.

(21) Appl. No.: 10/915,759

(22) Filed: Aug. 11, 2004

(65) Prior Publication Data

US 2005/0036411 A1    Feb. 17, 2005

(30) Foreign Application Priority Data

Aug. 13, 2003   (JP)   ............... 2003-292935

(51) Int. Cl.
*G11B 7/00* (2006.01)
(52) U.S. Cl. .................. 369/44.35
(58) Field of Classification Search .............. None
See application file for complete search history.

(56) References Cited

U.S. PATENT DOCUMENTS

| | | | | |
|---|---|---|---|---|
| 5,379,282 A | * | 1/1995 | Wachi | 369/44.35 |
| 5,627,807 A | * | 5/1997 | Abe | 369/44.29 |
| 5,970,032 A | * | 10/1999 | Ikeda et al. | 369/44.29 |
| 6,407,968 B1 | * | 6/2002 | Nakata et al. | 369/44.26 |
| 7,061,835 B2 | * | 6/2006 | Kobayashi | 369/44.29 |

FOREIGN PATENT DOCUMENTS

| JP | 5-135381 | | 6/1993 |
|---|---|---|---|
| JP | 06295448 A | * | 10/1994 |
| JP | 7-262571 | | 10/1995 |
| JP | 8-273171 | | 10/1996 |
| JP | 8-339550 | | 12/1996 |
| JP | 9-330522 | | 12/1997 |
| JP | 2000-251273 | | 9/2000 |

OTHER PUBLICATIONS

Notice of Ground of Rejection for Japanese Application No. 2003-292935 mailed on Aug. 23, 2005 and English translation thereof, 5 pages.
Patent Abstracts of Japan, Publication No. 07-262571, Publication Date: Oct. 13, 1995, 1 page.
Patent Abstracts of Japan, Publication No. 2000-251273, Publication Date: Sep. 14, 2000, 1 page.

(Continued)

*Primary Examiner*—William R. Korzuch
*Assistant Examiner*—Peter Vincent Agustin
(74) *Attorney, Agent, or Firm*—Osha Liang LLP

(57) ABSTRACT

A defocus amount specifying circuit specifies, as a focus error minimum defocus amount FMDF, a defocus amount by which the amplitude of a focus error signal becomes minimum in a state in which tracking servo is off in a period after insertion of an optical disc and before a seek operation, and specifies, as a jitter minimum defocus amount JMDF, a defocus amount by which a jitter amount becomes minimum in a state in which tracking servo is on. A defocus amount supplying circuit transmits the focus error minimum defocus amount FMDF to a focus servo circuit to perform focus control during a seek operation, and transmits the jitter minimum defocus amount JMDF to the focus servo circuit to perform focus control after the seek operation.

2 Claims, 3 Drawing Sheets

OTHER PUBLICATIONS

Patent Abstracts of Japan, Publication No. 08-339550 dated Dec. 24, 1996, 1 pg.
Patent Abstracts of Japan, Publication No. 09-330522 dated Dec. 22, 1997, 1 pg.
Patent Abstracts of Japan, Publication No. 08-273171 dated Oct. 18, 1996, 1 pg.
Patent Abstracts of Japan, Publication No. 05-135381 dated Jun. 1, 1993, 1 pg.

* cited by examiner

OPTICAL DISC PLAYBACK APPARATUS PERFORMING DEFOCUS ADJUSTMENT OF OBJECTIVE LENS

BACKGROUND OF THE INVENTION

1. Field of the Invention

The present invention relates to an optical disc playback apparatus, and particularly, to an optical disc playback apparatus performing defocus adjustment of an objective lens.

2. Description of the Background Art

A certain optical disc playback apparatus performs defocus adjustment of an objective lens. For example, Japanese Patent Laying-Open No. 8-339550 discloses the following control method in its description of a conventional technique.

Upon instruction of playing back an optical disc, a control circuit causes a laser diode of an optical pickup to emit light, and thereafter drives a focus actuator to move an objective lens in a prescribed moving range. This moving range is set in advance so that the position of the objective lens corresponding to the focal point of a light beam is present within the moving range.

In parallel, the control circuit performs focus pull-in. More specifically, the control circuit monitors a focus error signal that is detected while the objective lens is moved, and when the objective lens reaches the position corresponding to the focal point, it enters a closed loop-control mode having the focus error signal as a control signal.

Next, the control circuit actuates a spindle motor. When a rough CLV mode is attained, where adjustment allowable range of linear velocity is slightly broader than in a normal playback mode, the control circuit performs an offset adjustment so that the center of the amplitude of the tracking error signal matches with the reference voltage level of servo.

Next, it performs tracking pull-in. After performing tracking pull-in, it performs defocus adjustment to maximize an optimum jitter point or information signal amplitude.

After performing defocus adjustment, it performs AGC (Auto Gain Control) to optimize gains of focus servo and tracking servo, and then data is read.

As above, by performing defocus adjustment of the objective lens so that the jitter is optimized, errors in reading an optical disc can be reduced.

On the other hand, in a seek operation where a light beam crosses tracks, it is known that alternating current components in synchronization with the track-crossing are superimposed on a focus error signal. Such alternating current components occur due to variations in the amplitude among signals respectively output from divided portions of a four-divided photodetector, and also because the focus error signal is generated by astigmatism method. The alternating current components are referred to as T/F crosstalk.

Therefore, even when the defocus amount is adjusted so that the jitter amount is optimized, the focus is lost due to the effect of T/F crosstalk during the seek operation. Thus, the precision in counting the number of tracks being crossed is degraded. As a result, the light beam cannot reach the target track, failing to perform the seek operation.

SUMMARY OF THE INVENTION

Accordingly, an object of the present invention is to provide an optical disc playback apparatus reducing the effect of T/F crosstalk occurring during a seek operation and performing the seek operation without an error.

An optical disc playback apparatus according to an aspect of the present invention includes: a focus servo circuit performing focus control of an objective lens in accordance with a focus error signal and a defocus amount; a defocus amount specifying circuit specifying, as a first defocus amount, a defocus amount by which amplitude of the focus error signal becomes minimum in a state in which focus servo is on and tracking servo is off, in a period after insertion of an optical disc and before a seek operation; and a defocus amount supplying circuit supplying the specified first defocus amount to the focus servo circuit in a state in which focus servo is on and tracking servo is off during the seek operation.

In the optical disc playback apparatus, the defocus amount specifying circuit further specifies, as a second defocus amount, a defocus amount by which a jitter amount becomes minimum in a state in which focus servo is on and tracking servo is on, in a period after insertion of an optical disc and before a seek operation, and the defocus amount supplying circuit further supplies the specified second defocus amount to the focus servo circuit in a state in which focus servo is on and tracking servo is on after the seek operation.

According to the present invention, the effect of T/F crosstalk occurring during a seek-operation is reduced and the seek operation can be performed without an error.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, referring to the figures, an embodiment of the present invention will be described.

Configuration

Figure 1:
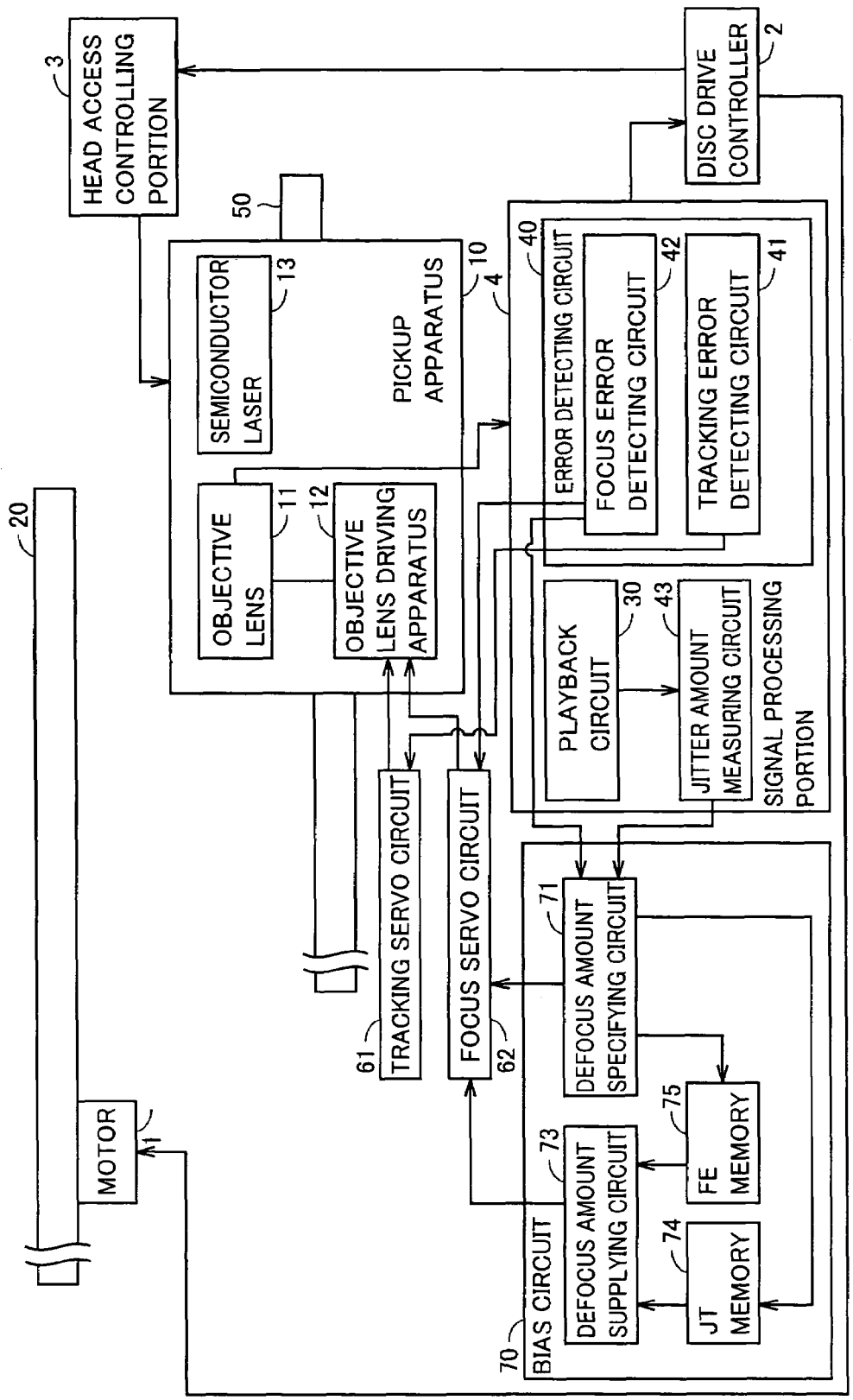
FIG. 1 is a schematic illustration of a configuration of an optical disc playback apparatus according to an embodiment of the present invention.

FIG. 1 is a schematic illustration of a configuration of an optical disc playback apparatus according to an embodiment of the present invention. Referring to FIG. 1, this optical disc playback apparatus includes a motor 1, a disc drive controller 2, a head access control portion 3, a guide 50, a pickup apparatus 10, a signal processing portion 4, a tracking servo circuit 61, a focus servo circuit 62, and a bias circuit 70.

Motor 1 receives a control signal from disc drive controller 2 and rotates an optical disc 20 at a prescribed number of rotation.

Pickup apparatus 10 is driven in a radial direction of optical disc 20 along guide 50 by head access control portion 3. Pickup apparatus 10 includes a semiconductor laser 13 that is a light source, an objective lens 11 condensing the laser light output from semiconductor laser 13 to a recording surface of optical disc 20 and receiving reflected light from the recording surface, and an objective lens driving apparatus 12 driving objective lens 11.

Objective lens driving apparatus 12 includes a magnet and coils. Objective lens driving apparatus 12 allows current to flow through the focus coil arranged in a magnetic field generated from the magnet and thereby drives objective lens 11 in a focusing direction, under control of focus servo circuit 62. Further, objective lens driving apparatus 12 allows current to flow through the tracking coil arranged in a magnetic field generated from the magnet and thereby drives objective lens 11 in a tracking direction, under control of tracking servo circuit 61.

Signal processing portion 4 includes a playback circuit 30, an error detecting circuit 40, and a jitter amount measuring circuit 43.

Playback circuit 30 detects reflected light incident on objective lens 11, and outputs a playback signal of data recorded on the recording surface.

Jitter amount measuring circuit 43 calculates a jitter amount of the playback signal output from playback circuit 30.

Error detecting circuit 40 includes a tracking error detect circuit 41 and a focus error detecting circuit 42.

Tracking error detect circuit 41 detects shift of an objective lens in a tracking direction (shift in the radial direction of the optical disc) from a reflect signal indicative of the reflected light incident on the objective lens, and generates a tracking error signal based on the detected shift.

Focus error detecting circuit 42 detects shift of the objective lens in a focusing direction (shift of the optical axis of the laser light) based on the reflect signal indicative of the reflected light incident on the objective lens through the astigmatism method, and generates a focus error signal based on the detected shift.

Tracking servo circuit 61 controls tracking of objective lens 11 performed by objective lens driving apparatus 12, based on the tracking error signal transmitted from tracking error detect circuit 41. Tracking servo circuit 61 performs tracking control when a jitter minimum defocus amount JMDF is specified in a period after insertion of the optical disc and before a seek operation, and after the seek operation (tracking servo on). Tracking servo circuit 61 stops tracking control when a focus error minimum defocus amount FMDF is specified in a period after insertion of the optical disc and before the seek operation, and during the seek operation (tracking servo off).

Focus servo circuit 62 controls focusing of objective lens 11 performed by objective lens driving apparatus 12 in accordance with the sum of the focus error signal transmitted from focus error detecting circuit 42 and the defocus amount transmitted from bias circuit 70. Focus servo circuit 62 performs focus control after insertion of the optical disc (focus servo on) and stops focus control after ejection of the optical disc (focus servo off).

Bias circuit 70 includes a defocus amount specifying circuit 71, a JT memory 74, an FE memory 75, and a defocus amount supplying circuit 73.

Defocus amount specifying circuit 71 successively changes the defocus amount by a prescribed amount in a state in which tracking servo is on and focus servo is on, and outputs it to focus servo circuit 62. Defocus amount specifying circuit 71 obtains the jitter amount, which has been changed by the focus control based on the changed defocus amount, from jitter amount measuring circuit 43. Defocus amount specifying circuit 71 specifies a defocus amount by which the magnitude of the jitter amount becomes minimum, and writes it to JT memory 74 as a jitter minimum defocus amount JMDF.

Figure 2:
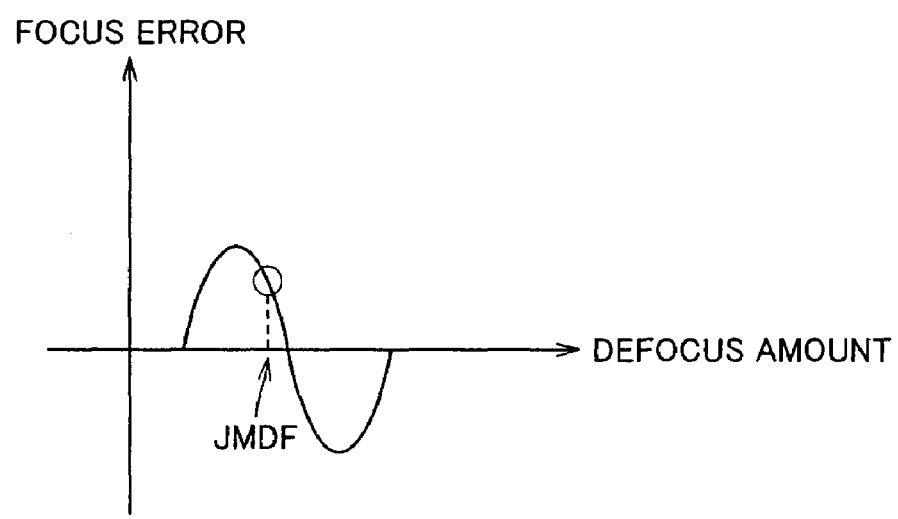
FIG. 2 is a graph showing the relationship between jitter minimum defocus amount JMDF and value of a focus error signal.

FIG. 2 is shows the relationship between jitter minimum defocus amount JMDF and value of a focus error signal. As shown in FIG. 2, focus error does not take on the value of "0" when focus servo circuit 62 is provided with the specified jitter minimum defocus amount JMDF.

Defocus amount specifying circuit 71 successively changes the defocus amount by a prescribed amount in a state in which tracking servo is off and focus servo is on, and outputs it to focus servo circuit 62. Defocus amount specifying circuit 71 obtains the focus error signal, which has been changed by the focus control based on the changed defocus amount, from focus error detecting circuit 42. Defocus amount specifying circuit 71 specifies a defocus amount by which the amplitude of the focus error signal becomes minimum, and writes it to FE memory 75 as a focus error minimum defocus amount FMDF.

Figure 3:
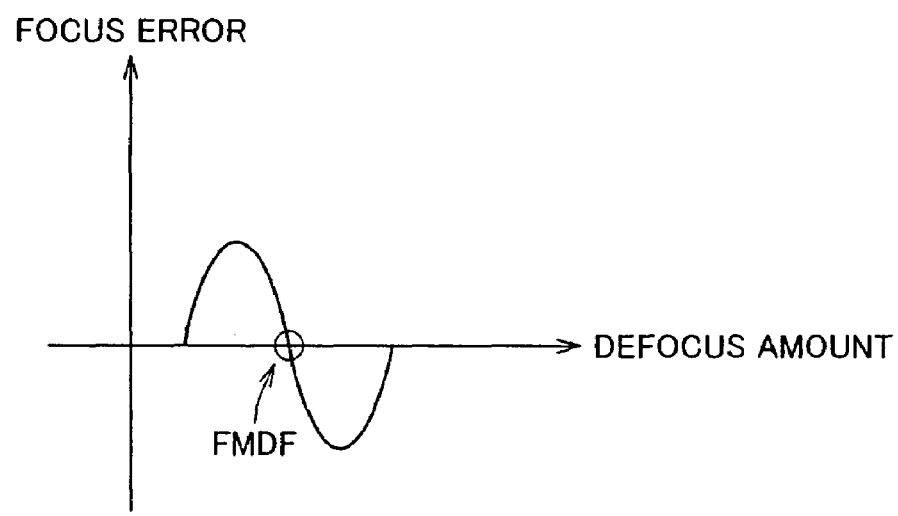
FIG. 3 is a graph showing the relationship between focus error minimum defocus amount FMDF and value of a focus error signal.

FIG. 3 shows the relationship between focus error minimum defocus amount FMDF and value of a focus error signal. As shown in FIG. 3, focus error takes on the value of "0" when focus servo circuit 62 is provided with the specified focus error minimum defocus amount FMDF.

JT memory 74 stores jitter minimum defocus amount JMDF.

FE memory 75 stores focus error minimum defocus amount FMDF.

Defocus amount supplying circuit 73 outputs focus error minimum defocus amount FMDF stored in FE memory 75 during a seek operation. Additionally, defocus amount supplying circuit 73 outputs jitter minimum defocus amount JMDF stored in JT memory 74 after the seek operation.

Operation

Figure 4:
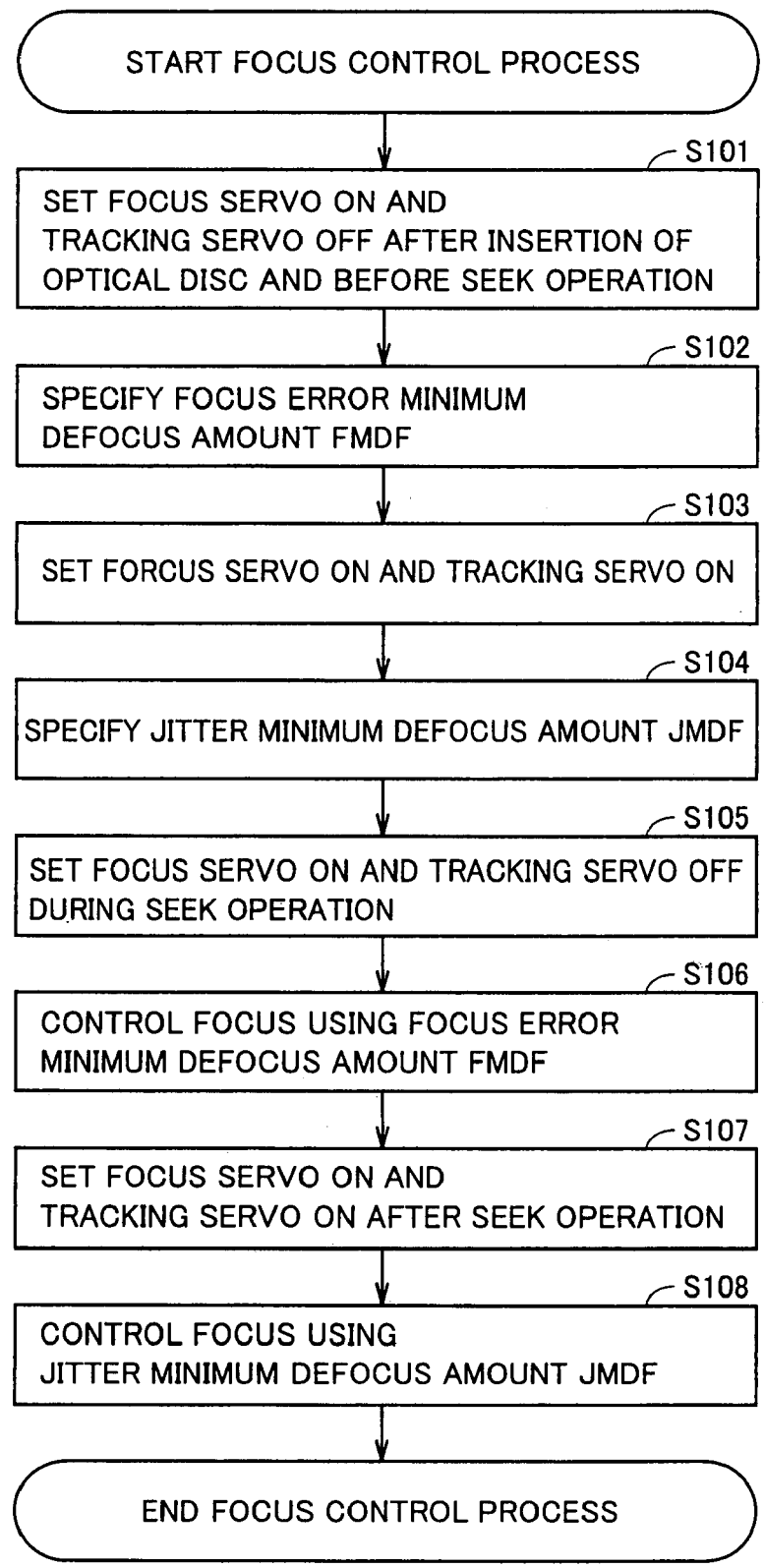
FIG. 4 is a flowchart showing an operation procedure of a focus control process of an optical disc playback apparatus according to an embodiment of the present invention.

Next, referring to the flowchart of FIG. 4, an operation of a focus control process of the optical disc playback apparatus according to an embodiment of the present invention will be described.

First, in a period after insertion of an optical disc into the optical disc playback apparatus and before a seek operation, focus servo circuit 62 starts focus control operation (focus servo on), and tracking servo circuit 61 stops tracking control operation (tracking servo off) (step S101).

Next, defocus amount specifying circuit 71 successively changes the defocus amount by a prescribed amount and outputs it. Focus servo circuit 62 performs focus control in accordance with the sum of the value of a focus error signal transmitted from focus error detecting circuit 42 and the defocus amount transmitted from defocus amount specifying circuit 72. Defocus amount specifying circuit 71 obtains the focus error signal, which has been changed by this focus control, from focus error detecting circuit 42.

Defocus amount specifying circuit 71 specifies a defocus amount by which the amplitude of the focus error signal becomes minimum, and writes it to FE memory 75 as focus error minimum defocus amount FMDF (step S102).

Next, focus servo circuit 62 continues focus control operation (focus servo on), and tracking servo circuit 61 starts tracking control operation (tracking servo on) (step S103).

Next, defocus amount specifying circuit 71 successively changes the defocus amount by a prescribed amount and outputs it. Focus servo circuit 62 performs focus control in accordance with the sum of the value of a focus error signal transmitted from focus error detecting circuit 42 and the defocus amount transmitted from defocus amount specifying circuit 72. Defocus amount specifying circuit 71 obtains the jitter amount, which has been changed by this focus control, from jitter amount measuring circuit 43.

Defocus amount specifying circuit 71 specifies a defocus amount by which the magnitude of the jitter amount becomes minimum, and writes it to JT memory 74 as jitter minimum defocus amount JMDF (step S104).

Next, when a seek operation is started, focus servo circuit 62 continues focus control operation (focus servo on), and tracking servo circuit 61 stops tracking control operation (tracking servo off) (step S105).

Defocus amount supplying circuit 73 outputs focus error minimum defocus amount FMDF stored in FE memory 75. Focus servo circuit 62 controls focusing of objective lens 11 performed by objective lens driving apparatus 12 in accordance with the sum of the focus error signal transmitted from focus error detecting circuit 42 and the focus error minimum defocus amount FMDF transmitted from defocus amount supplying circuit 73 (step S106).

After the seek operation, focus servo circuit 62 continues focus control operation (focus servo on), and tracking servo circuit 61 resumes tracking control operation (tracking servo on) (step S107).

Defocus amount supplying circuit 73 outputs jitter minimum defocus amount JMDF stored in JT memory 74. Focus servo circuit 62 controls focusing of objective lens 11 performed by objective lens driving apparatus 12 in accordance with the sum of the focus error signal transmitted from focus error detecting circuit 42 and jitter minimum defocus amount JMDF transmitted from defocus amount supplying circuit 73 (step S108).

As above, according to the optical disc playback apparatus according to the present embodiment, focus error minimum defocus amount FMDF by which the amplitude of the focus error signal becomes minimum is specified in a period after insertion of the optical disc and before a seek operation, and defocus adjustment is performed using this focus error minimum defocus amount FMDF during the seek operation. Therefore, the effect of T/F crosstalk occurring during the seek operation can be reduced to achieve the seek operation without an error.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disc playback apparatus, comprising:
    a focus servo circuit performing focus control of an objective lens in accordance with a focus error signal and a defocus amount;
    a defocus amount specifying circuit specifying, as a first defocus amount, a defocus amount by which amplitude of the focus error signal becomes minimum in a state in which focus servo is on and tracking servo is off, in a period after insertion of an optical disc and before a seek operation; and
    a defocus amount supplying circuit supplying said specified first defocus amount to said focus servo circuit in a state in which focus servo is on and tracking servo is off during the seek operation.

2. The optical disc playback apparatus according to claim 1, wherein
    said defocus amount specifying circuit further specifies, as a second defocus amount, a defocus amount by which a jitter amount becomes minimum in a state in which focus servo is on and tracking servo is on, in a period after insertion of an optical disc and before a seek operation, and
    said defocus amount supplying circuit further supplies said specified second defocus amount to said focus servo circuit in a state in which focus servo is on and tracking servo is on after the seek operation.

* * * * *